(12) United States Patent
Sumimura et al.

(10) Patent No.: US 10,352,246 B2
(45) Date of Patent: Jul. 16, 2019

(54) WATER FEEDING METHOD, WATER FEEDING SYSTEM IMPLEMENTING SAID METHOD, AND STEAM GENERATING FACILITY PROVIDED WITH WATER FEEDING SYSTEM

(71) Applicant: Mitsubishi Hitachi Power Systems, Ltd., Yokohama-shi, Kanagawa (JP)

(72) Inventors: Naohiro Sumimura, Yokohama (JP); Masaaki Yamasaki, Yokohama (JP); Masayuki Murakami, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 14 days.

(21) Appl. No.: 15/739,898

(22) PCT Filed: Jul. 7, 2016

(86) PCT No.: PCT/JP2016/070116
§ 371 (c)(1),
(2) Date: Dec. 26, 2017

(87) PCT Pub. No.: WO2017/018154
PCT Pub. Date: Feb. 2, 2017

(65) Prior Publication Data
US 2018/0363557 A1   Dec. 20, 2018

(30) Foreign Application Priority Data
Jul. 24, 2015   (JP) .................... 2015-146735

(51) Int. Cl.
*F02C 7/224*   (2006.01)
*F01K 23/06*   (2006.01)
(Continued)

(52) U.S. Cl.
CPC ............... *F02C 7/224* (2013.01); *F01K 7/38* (2013.01); *F01K 23/06* (2013.01); *F01K 23/10* (2013.01);
(Continued)

(58) Field of Classification Search
CPC .......... F02C 7/224; F01K 23/06; F01K 23/10; F01K 7/38; F01K 23/106; F22D 1/12; F22D 1/14; F22B 1/18
(Continued)

(56) References Cited

U.S. PATENT DOCUMENTS 3,244,898 A * 4/1966 Hickox ................... F01K 13/02
                                                    122/448.1
5,564,269 A * 10/1996 Briesch ................. F01K 21/042
                                                    60/39.182
(Continued)

FOREIGN PATENT DOCUMENTS

DE   699 31 831   5/2007
EP   0 314 028    5/1989
(Continued)

OTHER PUBLICATIONS

International Search Report dated Sep. 13, 2016 in International (PCT) Application No. PCT/JP2016/070116.
(Continued)

*Primary Examiner* — Hoang M Nguyen
(74) *Attorney, Agent, or Firm* — Wenderoth, Lind & Ponack, L.L.P.

(57) ABSTRACT

A water feeding system provided with: a first feed water line through which first feed water flows; a second feed water line through which second feed water having a lower pressure than the first feed water flows; a first heater that heats the first feed water; a first feed water introducing line that guides first heated feed water, which is the first feed (Continued)

water that has been heated by the first heater, to the second feed water line; a medium heat exchanger that causes the first heated feed water to exchange heat with a medium, thereby cooling the first heated feed water and heating the medium; and a cooling water injecting line that injects cooling water having a lower temperature than the first heated feed water into the first feed water introducing line, at a position located further to the second feed water line side than the medium heat exchanger.

19 Claims, 6 Drawing Sheets

(51) Int. Cl.
  *F01K 23/10* (2006.01)
  *F01K 7/38* (2006.01)
  *F22D 1/14* (2006.01)
  *F22B 1/18* (2006.01)
  *F22D 1/12* (2006.01)

(52) U.S. Cl.
  CPC ............... *F22B 1/18* (2013.01); *F22D 1/12* (2013.01); *F22D 1/14* (2013.01); *F01K 23/106* (2013.01)

(58) Field of Classification Search
  USPC .............................. 60/39.182, 654, 772, 784
  See application file for complete search history.

(56) References Cited

U.S. PATENT DOCUMENTS

| | | | | |
|---|---|---|---|---|
| 9,513,000 | B2* | 12/2016 | Marumoto | ................ F01K 7/40 |
| 2001/0023576 | A1* | 9/2001 | Rollins, III | ........... F01K 23/105 60/772 |
| 2003/0131601 | A1* | 7/2003 | Baxter | .................. F01K 23/105 60/772 |
| 2004/0011019 | A1 | 1/2004 | Schöttler et al. | |
| 2013/0074508 | A1 | 3/2013 | Sholes et al. | |
| 2015/0322822 | A1* | 11/2015 | Khandwavla | ............ F02C 6/18 60/774 |

FOREIGN PATENT DOCUMENTS

| | | |
|---|---|---|
| EP | 0 931 911 | 7/1999 |
| EP | 1 327 057 | 5/2009 |
| JP | 2001-329806 | 11/2001 |
| JP | 4287981 | 7/2009 |
| JP | 2012-184735 | 9/2012 |
| JP | 2015-68314 | 4/2015 |

OTHER PUBLICATIONS

English translation of Written Opinion dated Sep. 13, 2016 in International (PCT) Application No. PCT/JP2016/070116.

\* cited by examiner

WATER FEEDING METHOD, WATER FEEDING SYSTEM IMPLEMENTING SAID METHOD, AND STEAM GENERATING FACILITY PROVIDED WITH WATER FEEDING SYSTEM

TECHNICAL FIELD

The present invention relates to a water feeding method, a water feeding system that implements the water feeding method, and a steam generating facility provided with the water feeding system.

This application claims priority based on JP 2015-146735 filed in Japan on Jul. 24, 2015, of which the contents are incorporated herein by reference.

BACKGROUND ART

A combined cycle plant includes a gas turbine, an exhaust heat recovery boiler that generates steam using the heat of exhaust gas from the gas turbine, a steam turbine that is driven by the steam from the exhaust heat recovery boiler, and a condenser that turns steam exhausted from the steam turbine back into water. Water inside the condenser is supplied to the exhaust heat recovery boiler via a feed water line.

In a combined cycle plant disclosed in Patent Document 1 described below, fuel of a gas turbine is preheated using water heated in an exhaust heat recovery boiler. The exhaust heat recovery boiler includes a fuel economizer that heats water by causing water supplied to the exhaust heat recovery boiler to exchange heat with exhaust gas from the gas turbine, and an evaporator that turns water into steam by causing the water, which has been heated by the fuel economizer, to exchange heat with the exhaust gas. A heated feed water line, which supplies the water that has been heated in the fuel economizer to the evaporator, is branched partway. A diverging line that branches out from the heated feed water line is connected to a fuel preheater that heats fuel of the gas turbine. The fuel preheater heats the fuel by causing the fuel to exchange heat with the water from the diverging line. A collection line, which returns the water that has exchanged heat with the fuel, is connected to the fuel preheater. This collection line is connected to a feed water line.

In this combined cycle plant, when the flow rate of the fuel suddenly decreases significantly, an amount of heat exchanged between the fuel and the water in the fuel preheater suddenly decreases significantly. As a result, the water is returned to the feed water line while having been barely cooled by the fuel. A pressure in the feed water line is lower than a pressure in the diverging line that supplies the water to the fuel preheater. Thus, the pressure of the water that has barely been cooled by the fuel is reduced as the water enters into the feed water line or in the course of entering into the feed water line, which causes the water to flash. When the water flashes inside the feed water line, there is a risk that the line itself or a device or the like connected to the line may be damaged.

Thus, in this combined cycle plant, when a temperature of the water that has passed through the fuel preheater is higher than a predetermined temperature, the water is discharged into a condenser.

CITATION LIST

Patent Document

Patent Document 1: JP 2012-184735 A

SUMMARY OF INVENTION

Technical Problem

In the technology disclosed in the above-described Patent Document 1, since the water flowing through the line is discharged into the condenser, the flow rate of the water flowing through the line suddenly decreases significantly, thereby causing an operation condition of the system to change suddenly, and as a result, there is a risk that stable operation of the plant may be disrupted.

In view of the above-described problem, an object of the present invention is to provide a water feeding method that, even when an amount of heat exchanged between water and a medium, such as fuel, suddenly decreases significantly, is capable of preventing the water from flashing and inhibiting a flow rate of the water flowing through a line from suddenly decreasing significantly, a water feeding system that implements the water feeding method, and a steam generating facility provided with the water feeding system.

Solution to Problems

A water feeding system according to a first aspect of the invention for solving the above-described problem includes: a first feed water line through which first feed water flows; a second feed water line through which second feed water having a lower pressure than the first feed water flows; a first heater that heats the first feed water; a first feed water introducing line that guides first heated feed water which is the first feed water heated by the first heater to the second feed water line; a medium heat exchanger that is provided in the first feed water introducing line and that causes the first heated feed water to exchange heat with a medium, thereby cooling the first heated feed water and heating the medium; and a cooling water injecting line configured to inject cooling water into the first feed water introducing line at a position located further to the second feed water line side than the medium heat exchanger, the cooling water having a lower temperature than the first heated feed water.

In the water feeding system, even when an amount of cooling performed on the first heated feed water is reduced as a result of the flow rate of the medium flowing into the medium heat exchanger decreasing, flashing of the water can be prevented from occurring in the course of the water flowing into the second feed water line from the first feed water introducing line, by injecting the cooling water into the first feed water introducing line from the cooling water injecting line. Further, in the water feeding system, since the first heated feed water is not discharged out of the system, a sudden and significant reduction of the water flowing in the second feed water line can be suppressed.

A water feeding system according to a second aspect of the invention for solving the above-described problem is the water feeding system according to the first aspect in which the cooling water injecting line is a line branching out from a section in the first feed water line through which first non-heated feed water flows, the first non-heated feed water being the first feed water not yet heated by the first heater, and the cooling water injecting line injects the first non-heated feed water, as the cooling water, into the first feed water introducing line.

In the water feeding system, the first non-heated feed water which is the first feed water that has not yet been heated by the first heater is used as the cooling water for cooling the first feed water that has just flowed out from the medium heat exchanger. Thus, in the water feeding system, a device for pressurizing the cooling water is not required separately in order to be able to inject the cooling water into the first feed water that has just flowed out from the medium heat exchanger.

A water feeding system according to a third aspect of the invention for solving the above-described problem is the water feeding system according to the first or second aspect, further including: a thermometer that detects a temperature of water at a position, in the first feed water introducing line, located further to the second feed water line side than a position at which the cooling water is injected from the cooling water injecting line; and a cooling water flow rate adjustment valve that adjusts a flow rate of the cooling water flowing through the cooling water injecting line such that the temperature detected by the thermometer falls within a predetermined temperature range.

In the water feeding system, the flow rate of the cooling water is adjusted on the basis of the temperature of the water in the first feed water introducing line. Thus, in the water feeding system, the temperature of the water introduced from the first feed water introducing line into the second feed water line is managed, and the flashing of water can be reliably prevented from occurring in the course of the water being introduced into the second feed water line.

A water feeding system according to a fourth aspect of the invention for solving the above-described problem is the water feeding system according to any one of the first to third aspects, further including a flow rate adjustment valve that is provided at a position, in the first feed water introducing line, located further to the second feed water line side than the position at which the cooling water is injected from the cooling water injecting line, and that adjusts a flow rate of water flowing into the second feed water line from the first feed water introducing line.

In the water feeding system, the flow rate of the water that has been introduced into the second feed water line from the first feed water introducing line can be managed in the second feed water line.

A water feeding system according to a fifth aspect of the invention for solving the above-described problem is the water feeding system according to any one of the first to fourth aspects in which the first heater is a heat exchanger that causes compressed air extracted from a compressor of a gas turbine to exchange heat with the first feed water, thereby cooling the compressed air and heating the first feed water.

A water feeding system according to a sixth aspect of the invention for solving the above-described problem is the water feeding system according to any one of the first to fifth aspects in which the first feed water line has a first feed water main line and a first feed water diverging line that branches out from the first feed water main line. The water feeding system further includes a second heater that is provided at a position, in the first feed water main line, located further to a downstream side than a branching position of the first feed water diverging line, and that heats the first feed water flowing through the first feed water main line. The first heater is provided in the first feed water diverging line and heats the first feed water flowing through the first feed water diverging line.

A water feeding system according to a seventh aspect of the invention for solving the above-described problem is the water feeding system according to the sixth aspect in which the first feed water introducing line is connected to the first feed water diverging line, the first heater is provided at a position, in the first feed water diverging line, located further to the branching position side than a position at which the first feed water introducing line is connected to the first feed water diverging line, and the first feed water diverging line is connected to the first feed water main line at a position located further to the downstream side than the position at which the second heater is provided.

A water feeding system according to an eighth aspect of the invention for solving the above-described problem is the water feeding system according to any one of the first to seventh aspects, further including a second medium heat exchanger that causes the medium to exchange heat with water, thereby heating the medium and cooling the water, before the medium is heated by a first medium heat exchanger which is the medium heat exchanger.

A water feeding system according to a ninth aspect of the invention for solving the above-described problem is the water feeding system according to the eighth aspect in which the second medium heat exchanger is a heat exchanger that is provided at a position, in the second feed water line, located further to the downstream side than a position at which the first feed water introducing line is connected to the second feed water line, and that causes water flowing through the second feed water line to exchange heat with the medium.

A water feeding system according to a tenth aspect of the invention for solving the above-described problem is the water feeding system according to any one of the first to ninth aspects in which the medium is a fuel supplied to a gas turbine, and the medium heat exchanger is a fuel preheater that heats the fuel.

A steam generating facility according to an eleventh aspect of the invention for solving the above-described problem includes:

the water feeding system according to any one of the first to tenth aspects; and an evaporator that causes an exhaust gas from a gas turbine to exchange heat with the first feed water that has passed through the first feed water line and causes the first feed water to be heated and turn into steam.

A steam generating facility according to a twelfth aspect of the invention for solving the above-described problem includes:

the water feeding system according to any one of the first to fourth aspects; and an evaporator that causes an exhaust gas from a gas turbine to exchange heat with the first feed water that has passed through the first feed water line and causes the first feed water to be heated and turn into steam. The first heater is a fuel economizer that causes the exhaust gas to exchange heat with the first feed water, thereby heating the first feed water flowing into the evaporator.

A steam generating facility according to a thirteenth aspect of the invention for solving the above-described problem includes:

the water feeding system according to the sixth or seventh aspect; and an evaporator that causes an exhaust gas from a gas turbine to exchange heat with the first feed water that has passed through the first feed water line and causes the first feed water to be heated and turn into steam. The second heater is a fuel economizer that causes the exhaust gas to exchange heat with the first feed water, thereby heating the first feed water flowing into the evaporator.

A water feeding method according to a fourteenth aspect of the invention for solving the above-described problem includes:

a first heating step of heating first feed water; a medium heat exchange step of causing first heated feed water which is the first feed water heated in the first heating step to exchange heat with a medium, thereby cooling the first heated feed water and heating the medium; a first feed water introducing step of introducing the first heated feed water which has gone through the medium heat exchange step into second feed water having a lower pressure than, the first feed water; and a cooling water injecting step of injecting cooling water having a lower temperature than the first heated feed water into the first heated feed water before the first heated feed water that has gone through the medium heat exchange step is introduced into the second feed water.

In the water feeding method, even when the amount of cooling performed on the first heated feed water is reduced as a result of a decreasing flow rate of the medium with which the first heated feed water exchanges heat in the medium heat exchange step, flashing can be prevented from occurring in the course of the first heated feed water flowing into the second feed water, by injecting the cooling water into the first heated feed water in the cooling water injecting step. Further, in the water feeding method, since the first heated feed water is not discharged out of the system, a sudden and significant reduction of water occurring after the first heated feed water merges into the second feed water can be inhibited.

A water feeding method according to a fifteenth aspect of the invention for solving the above-described problem is the water feeding method according to the fourteenth aspect in which first non-heated feed water that is the first feed water not yet heated in the first heating step is used as the cooling water in the cooling water injecting step.

In the water feeding method, the first non-heated feed water, which is the first feed water that has not yet been heated in the first heating step, is used as the cooling water for cooling the first feed water that has just gone through the medium heat exchange step. Thus, in the water feeding method, a device for pressurizing the cooling water is not separately required in order to be able to inject the cooling water into the first feed water that has just gone through the medium heat exchange step.

A water feeding method according to a sixteenth aspect of the invention for solving the above-described problem is the water feeding method according to the fourteenth or fifteenth aspect in which the cooling water injecting step includes a cooling water flow rate adjusting step of adjusting a flow rate of the cooling water such that, before water including the first heated feed water is introduced into the second feed water, a temperature of the water falls within a predetermined temperature range.

In the water feeding method, the flow rate of the cooling water is adjusted on the basis of the temperature of water including the first heated feed water. Thus, in the water feeding method, the flashing can be reliably prevented from occurring in the course of the first heated feed water flowing into the second feed water.

A water feeding method according to a seventeenth aspect of the invention for solving the above-described problem is the water feeding method according to any one of the fourteenth to sixteenth aspects that further includes a flow rate adjusting step of adjusting a flow rate of water which includes the first heated feed water and is to be introduced into the second feed water.

In the water feeding method, a flow rate of water after the first feed water is introduced into the second feed water can be managed.

A water feeding method according to an eighteenth aspect of the invention for solving the above-described problem is the water feeding system according to any one of the fourteenth to seventeenth aspects in which, in the first heating step, compressed air extracted from a compressor of a gas turbine is caused to exchange heat with the first feed water, thereby cooling the compressed air and heating the first feed water.

A water feeding method according to a nineteenth aspect of the invention for solving the above-described problem is the water feeding method according to any one of the fourteenth to eighteenth aspects in which, in the medium heat exchange step, a fuel supplied to a gas turbine is used as the medium to cause first heated feed water to exchange heat with the fuel, thereby cooling the first heated feed water and heating the fuel.

Advantageous Effects of Invention

According to an aspect of the present invention, even when an amount of heat exchanged between water and a medium suddenly decreases significantly, a change of an operation condition of a system can be suppressed while flashing of the water is prevented from occurring.

DESCRIPTION OF EMBODIMENTS

Embodiments of the present invention are described below with reference to the accompanying drawings.

First Embodiment

A first embodiment of a combined cycle plant provided with a water feeding system according to the present invention will be described below with reference to FIG. 1 to FIG. 4.

Figure 1:
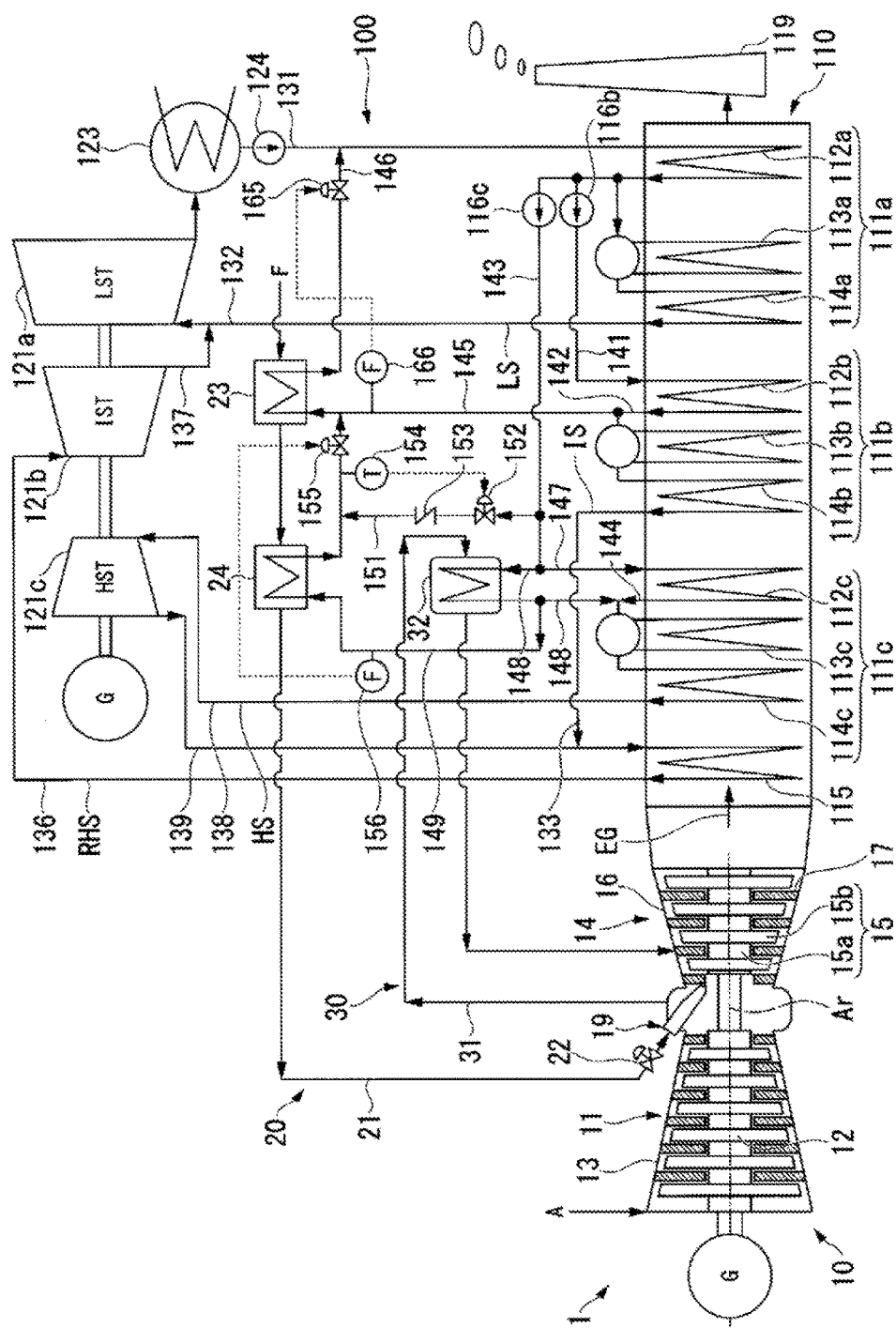
FIG. 1 is a system diagram illustrating a combined cycle plant of a first embodiment according to the present invention.

As illustrated in FIG. 1, the combined cycle plant of the present embodiment includes a gas turbine installation 1, and an exhaust heat recovery facility 100 that recovers the heat of an exhaust gas EG from the gas turbine installation 1.

The gas turbine installation 1 includes a gas turbine 10, a fuel supply system 20 that supplies a fuel F to the gas turbine 10, and a component cooling system 30 that cools hot parts of the components forming the gas turbine 10.

The gas turbine 10 includes a compressor 11 that compresses air A, a combustor 19 that combusts the fuel F in the air compressed by the compressor 11 to generate combustion gas, and a turbine 14 that is driven by the high-temperature high-pressure combustion gas. The compressor 11 includes a compressor rotor 12 that rotates around an axis Ar and a compressor casing 13 that covers the compressor rotor 12. The turbine 14 includes a turbine rotor 15 that rotates around the axis Ar and a turbine casing 16 that covers the turbine rotor 15. The turbine rotor 15 includes a rotor shaft 15a and a plurality of blade rows 15b that are attached to the outer circumference of the rotor shaft 15a. Vane rows 17, each of which is disposed on the upstream side of each of the blade rows 15b, are fixed to the inner circumference of the turbine casing 16. The compressor rotor 12 and the turbine rotor 15 rotate around the same axis Ar and are connected to each other to form a gas turbine rotor. A rotor of a generator G is connected to this gas turbine rotor, for example. The compressor casing 13 and the turbine casing 16 are connected to each other to form a gas turbine casing.

The fuel supply system 20 includes a fuel supply line 21 that supplies the fuel F to the combustor 19 of the gas turbine 10, a fuel flow rate adjustment valve 22 that adjusts the flow rate of the fuel F supplied from the fuel supply line 21 to the combustor 19, and a first fuel preheater 23 and a second fuel preheater 24 that heat the fuel F flowing through the fuel supply line 21.

The component cooling system 30 includes an air extraction line 31 that extracts air compressed by the compressor 11 and guides the air to the hot parts of the turbine 14, and an air cooler 32 that cools air flowing through the air extraction line 31. Here, the hot parts are components exposed to the combustion gas generated by the combustor 19. For example, the hot parts include the combustor 19, the blade rows 15b of the turbine rotor 15, the vane rows 17 and the like.

The exhaust heat recovery facility 100 includes: an exhaust heat recovery boiler 110 that generates steam using the heat of the combustion gas that has driven the turbine 14, that is, the exhaust gas EG exhausted from the gas turbine 10; a stack 119 that discharges the exhaust gas EG, which has passed through the exhaust heat recovery boiler 110, into the atmosphere; steam turbines 121a, 121b, and 121c that are driven by the steam generated by the exhaust heat recovery boiler 110; a condenser 123 that turns the steam, which has driven the steam turbine 121a, back into water; and a feed water pump 124 that returns the water in the condenser 123 to the exhaust heat recovery boiler 110.

The exhaust heat recovery facility 100 includes a low-pressure steam turbine 121a, an intermediate-pressure steam turbine 121b, and a high-pressure steam turbine 121c as the steam turbines 121a, 121b, and 121c. Rotors of the steam turbines 121a, 121b, and 121c are connected to one another. A rotor of a generator G is connected to these rotors, for example. Note that, herein, although the generator G that is driven by the steam turbines 121a, 121b, and 121c to generate power is a separate generator from the generator G that is driven by the gas turbine 10 to generate power, these generators G may be formed as a single generator.

The exhaust heat recovery boiler 110 includes a low-pressure steam generating part 111a that generates low-pressure steam LS, an intermediate-pressure steam generating part 111b that generates intermediate-pressure steam IS, a high-pressure steam generating part 111c that generates high-pressure steam HS, and a reheater 115 that heats the steam that has driven the high-pressure steam turbine 121c. The low-pressure steam generating part 111a, the intermediate-pressure steam generating part 111b, and the high-pressure steam generating part 111c respectively include fuel economizers 112a, 112b, and 112c that heat water, evaporators 113a, 113b, and 113c that turn the water heated by the fuel economizers 112a, 112b, and 112c into steam, and superheaters 114a, 114b, and 114c that superheat the steam generated by the evaporators 113a, 113b, and 113c. In addition to the fuel economizers 112b and 112c, the evaporators 113b and 113c, and the superheaters 114b and 114c, the intermediate-pressure steam generating part 111b and the high-pressure steam generating part 111c further include pumps 116b and 116c that supply the water heated by the fuel economizer 112a of the low-pressure steam generating part 111a to their respective fuel economizers 112b and 112c.

Note that, in the following description, the fuel economizer 112c of the high-pressure steam generating part 111c, the evaporator 113c of the high-pressure steam generating part 111c, and the superheater 114c of the high-pressure steam generating part 111c will be respectively referred to as a high-pressure fuel economizer 112c, a high-pressure evaporator 113c, and a high-pressure superheater 114c. Further, the fuel economizer 112b of the intermediate-pressure steam generating part 111b, the evaporator 113b of the intermediate-pressure steam generating part 111b, and the superheater 114b of the intermediate-pressure steam generating part 111b will be respectively referred to as an intermediate-pressure fuel economizer 112b, an intermediate-pressure evaporator 113b, and an intermediate-pressure superheater 114b. Further, the fuel economizer 112a of the low-pressure steam generating part 111a, the evaporator 113a of the low-pressure steam generating part 111a, and the superheater 114a of the low-pressure steam generating part 111a will be respectively referred to as a low-pressure fuel economizer 112a, a low-pressure evaporator 113a, and a low-pressure superheater 114a. Furthermore, the pump 116b of the intermediate-pressure steam generating part 111b and the pump 116c of the high-pressure steam generating part 111c will be respectively referred to as an intermediate-pressure pump 116b and a high-pressure pump 116c.

The reheater 115, the high-pressure superheater 114c, the high-pressure evaporator 113c, the high-pressure fuel economizer 112c, the intermediate-pressure superheater 114b, the intermediate-pressure evaporator 113b, the intermediate-pressure fuel economizer 112b, the low-pressure superheater 114a, the low-pressure evaporator 113a, and the low-pressure fuel economizer 112a are arranged side by side in this order toward the downstream side of the exhaust gas EG that flows from the turbine 14 to the stack 119. Note that this order is merely an example and may be another order.

The condenser 123 and the low-pressure fuel economizer 112a are connected by a feed water line 131. The aforementioned feed water pump 124 is provided in this feed water line 131. The low-pressure superheater 114a and a steam inlet of the low-pressure steam turbine 121a are connected by a low-pressure steam line 132 that supplies the low-pressure steam LS from the low-pressure superheater 114a to the low-pressure steam turbine 121a. The condenser 123 and a steam outlet of the low-pressure steam turbine 121a are connected to each other such that the low-pressure steam LS, which has driven the low-pressure steam turbine 121a, is supplied to the condenser 123. The high-pressure superheater 114c and a steam inlet of the high-pressure steam turbine 121c are connected by a high-pressure steam line 138 that supplies the high-pressure steam HS from the high-pressure superheater 114c to the high-pressure steam turbine 121c. A steam outlet of the high-pressure steam turbine 121c and a steam inlet of the reheater 115 are connected by a high-pressure steam collection line 139 that supplies the high-pressure steam HS from the high-pressure steam turbine 121c to the reheater 115. A steam outlet of the reheater 115 and a steam inlet of the intermediate-pressure steam turbine 121b are connected by a reheat steam line 136 that supplies the high-pressure steam HS superheated by the reheater 115 to the intermediate-pressure steam turbine 121b, as reheat steam RHS. An intermediate-pressure steam collection line 137 is connected to a steam outlet of the intermediate-pressure steam turbine 121b. This intermediate-pressure steam collection line 137 is connected to the low-pressure steam line 132.

An intermediate-pressure steam line 133 is connected to a steam outlet of the intermediate-pressure superheater 114b. This intermediate-pressure steam line 133 is connected to the high-pressure steam collection line 139. A discharge port of the intermediate-pressure pump 116b and a water inlet of the intermediate-pressure fuel economizer 112b are connected by an intermediate-pressure water line 141. A water outlet of the intermediate-pressure fuel economizer 112b and a water inlet of the intermediate-pressure evaporator 114b are connected by an intermediate-pressure heated water line 142. A discharge port of the high-pressure pump 116c and a water inlet of the high-pressure fuel economizer 112c are connected by a high-pressure water line 143. A water outlet of the high-pressure fuel economizer 112c and a water inlet of the high-pressure evaporator 113c are connected by a high-pressure heated water line 144.

The exhaust heat recovery facility 100 further includes the aforementioned air cooler 32, first fuel preheater 23 and second fuel preheater 24, and various lines that supply the water heated by the exhaust heat recovery boiler 110 to the air cooler 32, the first fuel preheater 23, and the second fuel preheater 24. In this way, the air cooler 32, the first fuel preheater 23, and the second fuel preheater 24 form a part of the exhaust heat recovery facility 100, and also form a part of the gas turbine installation 1.

An intermediate-pressure heated water diverging line 145 is connected to the intermediate-pressure heated water line 142. This intermediate-pressure heated water diverging line 145 is connected to a water inlet of the first fuel preheater 23. The first fuel preheater 23 causes intermediate-pressure heated water from the intermediate-pressure heated water diverging line 145 to exchange heat with the fuel F, thereby heating the fuel F and cooling the intermediate-pressure heated water. A flow rate meter 166 that detects the flow rate of the intermediate-pressure heated water flowing through the intermediate-pressure heated water diverging line 145 is provided in the intermediate-pressure heated water diverging line 145. An intermediate-pressure water collection line 146 is connected to a water outlet of the first fuel preheater 23. The intermediate-pressure water collection line 146 is connected to the feed water line 131. A collected water flow rate adjustment valve 165 is provided in the intermediate-pressure water collection line 146. The collected water flow rate adjustment valve 165 adjusts a valve opening amount so as to cause the flow rate detected by the flow rate meter 166 provided in the intermediate-pressure heated water diverging line 145 to be a target flow rate. The target flow rate is a flow rate that is set in accordance with the flow rate of the fuel supplied to the gas turbine 10, the output of the gas turbine and the like, for example.

The high-pressure water line 143 branches out into two lines partway. One line forms a high-pressure water main line 147 connected to the high-pressure fuel economizer 112c, and the other line forms a high-pressure water diverging line 148. The high-pressure water diverging line 148 is connected to the high-pressure heated water line 144. The air cooler 32 is provided in this high-pressure water diverging line 148. This air cooler 32 causes high-pressure water from the high-pressure water diverging line 148 to exchange heat with air Ac extracted from the compressor 11 of the gas turbine 10, thereby cooling the air Ac and heating the high-pressure water.

A high-pressure water introducing line 149 is connected to the high-pressure water diverging line 148 at a position between the air cooler 32 and a connection position of the high-pressure water diverging line 148 and the high-pressure heated water line 144. This high-pressure water introducing line 149 is connected to the intermediate-pressure heated water diverging line 145. The second fuel preheater 24 is provided in this high-pressure water introducing line 149. The second fuel preheater 24 causes high-pressure heated water from the high-pressure water introducing line 149 to exchange heat with the fuel F heated in the first fuel preheater 23, thereby heating the fuel F and cooling the high-pressure heated water. The high-pressure heated water that has been cooled in the second fuel preheater 24 is supplied to the first fuel preheater 23, as high-pressure collected water, via the high-pressure water introducing line 149 and the intermediate-pressure heated water diverging line 145.

A cooling water injecting line 151 is connected to the high-pressure water main line 147 at a position located further to the high-pressure pump 116c side than a branching position of the high-pressure water diverging line 148. This cooling water injecting line 151 is connected to the high-pressure water introducing line 149 at a position located further to the intermediate-pressure heated water diverging line 145 side than the second fuel preheater 24. The cooling water injecting line 151 is provided with a cooling water flow rate adjustment valve 152 that adjusts the flow rate of the high-pressure water flowing through the cooling water injecting line 151 as cooling water, and a check valve 153 that prevents water from flowing into the cooling water injecting line 151 from the high-pressure water introducing line 149.

Flow rate meters 156 and 166 that detect the flow rate of the high-pressure heated water flowing through the high-pressure water introducing line 149 are provided at positions, in the high-pressure water introducing line 149, located between a connection position of the high-pressure water introducing line 149 with the high-pressure water diverging line 148 and a connection position of the high-pressure water introducing line 149 with the second fuel preheater 24. A thermometer 154 that detects the temperature of the water flowing through the high-pressure water introducing line 149 and a collected water flow rate adjustment valve 155 that adjusts the flow rate of water flowing through the high-pressure water introducing line 149 are provided at positions, in the high-pressure water introducing line 149, located further to the intermediate-pressure heated water diverging line 145 side than a connection position of the high-pressure water introducing line 149 with the cooling water injecting line 151.

In the present embodiment, a steam generating facility is formed by constituent elements of the exhaust heat recovery facility 100 excluding the steam turbines 121a, 121b, and 121c, and the condenser 123. More specifically, the steam generating facility includes the exhaust heat recovery boiler 110, the air cooler 32, the first fuel preheater 23, and the second fuel preheater 24. Further, this steam generating facility includes: various lines that interconnect the exhaust heat recovery boiler 110, each of the steam turbines 121a, 121b, and 121c, the air cooler 32, the first fuel preheater 23, and the second fuel preheater 24; valves provided in those various lines; and the feed water line 131. This steam generating facility is provided with a water feeding system. This water feeding system will be described later.

Next, operations of the combined cycle plant according to the above-described present embodiment will be described.

The compressor 11 of the gas turbine 10 compresses the air A in the atmosphere and supplies the compressed air A to the combustor 19. Further, the fuel F from the fuel supply line 21 is also supplied to the combustor 19. Inside the combustor 19, the fuel F is combusted in the compressed air A to generate a high-temperature, high-pressure combustion gas. This combustion gas is supplied to the turbine 14 and causes the turbine rotor 15 to rotate. The generator G connected to the gas turbine 10 generates power by the rotation of the turbine rotor 15.

The combustion gas that has rotated the turbine rotor 15 is exhausted from the gas turbine 10 as the exhaust gas EG, and released to the atmosphere from the stack 119 via the exhaust heat recovery boiler 110. The exhaust heat recovery facility 100 recovers heat contained in the exhaust gas EG as the exhaust gas EG from the gas turbine 10 passes through the exhaust heat recovery boiler 110.

The water from the condenser 123 is supplied to the low-pressure fuel economizer 112a of the exhaust heat recovery boiler 110 via the feed water line 131. The low-pressure fuel economizer 112a heats the water by causing the water to exchange heat with the exhaust gas EG. A portion of the water heated by the low-pressure fuel economizer 112a is further heated by the low-pressure evaporator 113a and turns into steam. This steam is further superheated by the low-pressure superheater 114a and supplied, as the low-pressure steam LS, to the low-pressure steam turbine 121a via the low-pressure steam line 132. The steam that has driven the low-pressure steam turbine 121a is turned back into water by the condenser 123. This water is supplied from the condenser 123 to the low-pressure fuel economizer 112a once again via the feed water line 131.

Another portion of the water heated by the low-pressure fuel economizer 112a is pressurized by the intermediate-pressure pump 116b and supplied, as intermediate-pressure water, to the intermediate-pressure fuel economizer 112b via the intermediate-pressure water line 141. Further, the remaining water heated by the low-pressure fuel economizer 112a is pressurized by the high-pressure pump 116c and supplied, as high-pressure water, to the high-pressure fuel economizer 112c via the high-pressure water line 143.

The high-pressure fuel economizer 112c heats the high-pressure water supplied from the high-pressure pump 116c by causing the water to exchange heat with the exhaust gas EG. The high-pressure water heated by the high-pressure fuel economizer 112c is supplied, as high-pressure heated water, to the high-pressure evaporator 113c via the high-pressure heated water line 144. The high-pressure evaporator 113c causes the high-pressure heated water to exchange heat with the exhaust gas EG and turns the high-pressure heated water into steam. The steam is further superheated by the high-pressure superheater 114c and supplied as the high-pressure steam HS to the high-pressure steam turbine 121c via the high-pressure steam line 138.

The intermediate-pressure fuel economizer 112b heats the intermediate-pressure water supplied from the intermediate-pressure pump 116b by causing the water to exchange heat with the exhaust gas EG. The intermediate-pressure water heated by the intermediate-pressure fuel economizer 112b is supplied to the intermediate-pressure evaporator 113b as intermediate-pressure heated water, via the intermediate-pressure heated water line 142. The intermediate-pressure evaporator 113b causes the intermediate-pressure heated water to exchange heat with the exhaust gas EG and turns the intermediate-pressure heated water into steam. The steam is further superheated by the intermediate-pressure superheater 114b and supplied, as the intermediate-pressure steam IS, to the reheater 115 located on the most upstream side (on the gas turbine 10 side) in the exhaust heat recovery boiler 110, via the intermediate-pressure steam line 133 and the high-pressure steam collection line 139.

The high-pressure steam HS that has driven the high-pressure steam turbine 121c and the intermediate-pressure steam IS from the intermediate-pressure superheater 114b are supplied to the reheater 115 located on the most upstream side (on the gas turbine 10 side) in the exhaust heat recovery boiler 110, via the high-pressure steam collection line 139. The reheater 115 superheats this steam by causing the steam to exchange heat with the exhaust gas EG, and supplies the steam as the reheat steam RHS to the intermediate-pressure steam turbine 121b via the reheat steam line 136.

The reheat steam RHS that has driven the intermediate-pressure steam turbine 121b is supplied to the low-pressure steam turbine 121a via the intermediate-pressure steam collection line 137 and the low-pressure steam line 132.

A portion of the intermediate-pressure heated water that is the intermediate-pressure water heated by the intermediate-pressure fuel economizer 112b is supplied to the first fuel preheater 23 via the intermediate-pressure heated water diverging line 145. In the first fuel preheater 23, the fuel F that has passed through the fuel supply line 21 is caused to exchange heat with the intermediate-pressure heated water, thereby heating the fuel F and cooling the intermediate-pressure heated water. The intermediate-pressure heated water cooled in the first fuel preheater 23 is returned to the feed water line 131 via the intermediate-pressure water collection line 146 as intermediate-pressure collected water. Further, the fuel F heated in the first fuel preheater 23 is supplied to the second fuel preheater 24 via the fuel supply line 21.

A portion of the high-pressure water flowing through the high-pressure water main line 147 is supplied to the air cooler 32 via the high-pressure water diverging line 148. In the air cooler 32, the high-pressure water is caused to exchange heat with the air Ac extracted from the compressor 11 of the gas turbine 10, thereby cooling the air Ac and heating the high-pressure water. The air Ac cooled in the air cooler 32 is supplied to the hot parts of the turbine 14 via the air extraction line 31. Further, a portion of the high-pressure water heated in the air cooler 32 is supplied, as the high-pressure heated water, to the high-pressure evaporator 113c via the high-pressure water diverging line 148 and the high-pressure heated water line 144.

A portion of the remaining high-pressure heated water flowing through the high-pressure water diverging line 148 is supplied to the second fuel preheater 24 via the high-pressure water introducing line 149. In the second fuel preheater 24, the fuel F heated in the first fuel preheater 23 is caused to exchange heat with the high-pressure heated water, thereby heating the fuel F and cooling the high-pressure heated water. The high-pressure heated water cooled in the second fuel preheater 24 flows into the intermediate-pressure heated water diverging line 145 via the high-pressure water introducing line 149 as the high-pressure collected water. The high-pressure collected water that has flowed into the intermediate-pressure heated water diverging line 145 merges with the intermediate-pressure heated water flowing through the intermediate-pressure heated water diverging line 145, and flows into the first fuel preheater 23. Further, the fuel F heated in the second fuel preheater 24 is supplied to the combustor 19 via the fuel supply line 21.

Next, the water feeding system of the present embodiment will be described with reference to FIG. 2 and FIG. 3.

Figure 2:
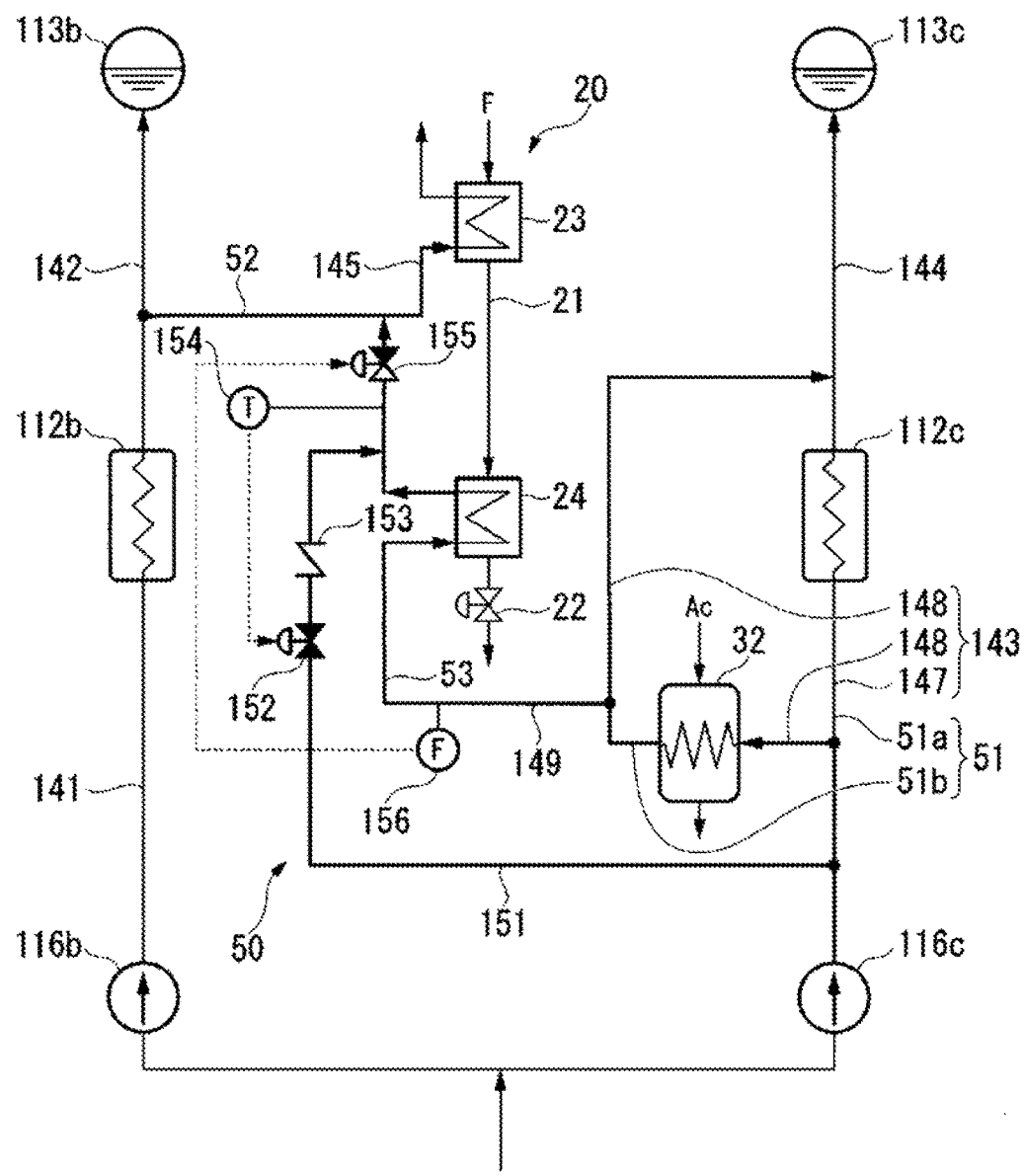
FIG. 2 is a system diagram (when a gas turbine is operating steadily) illustrating a water feeding system of the first embodiment according to the present invention.
Figure 3:
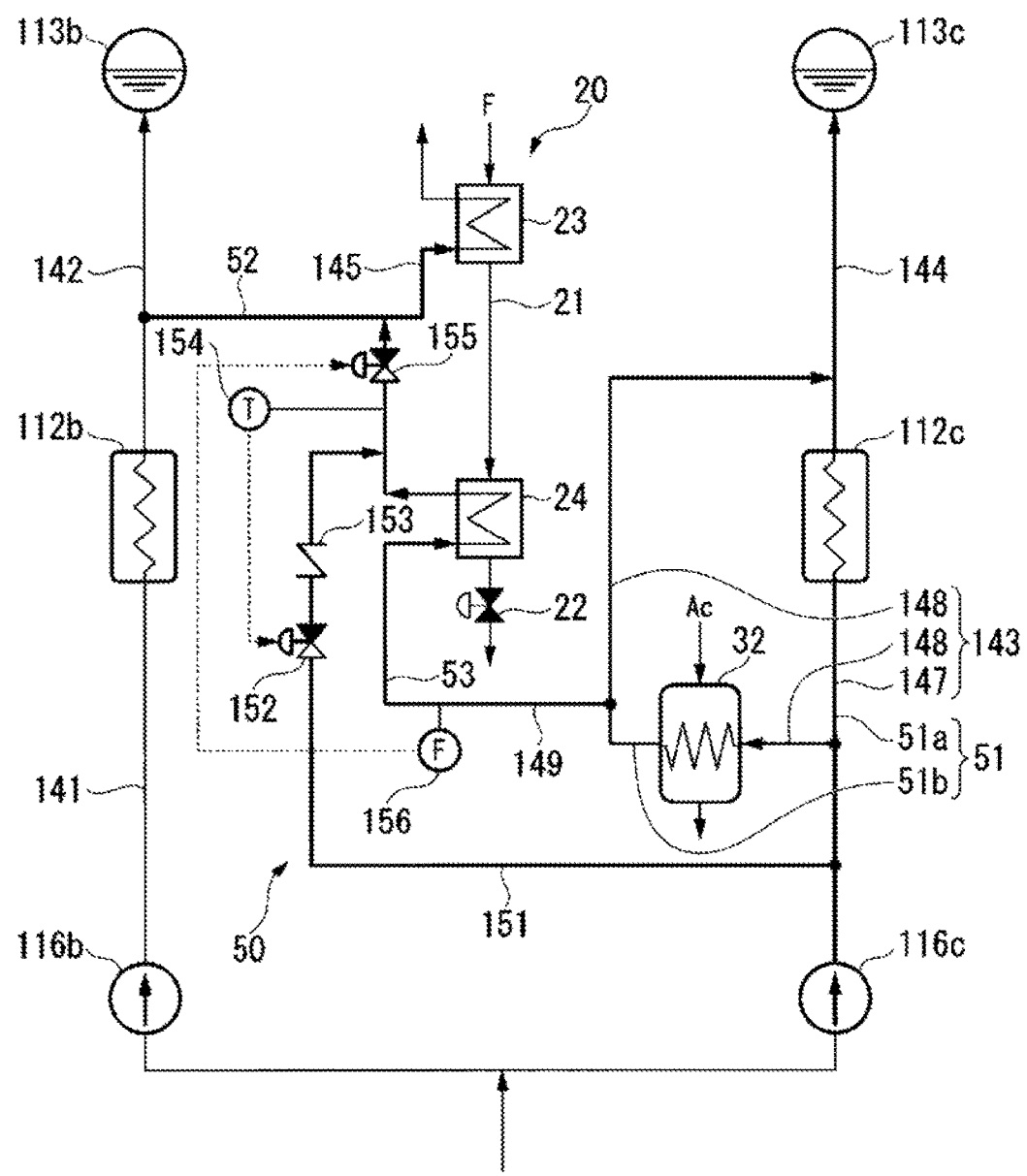
FIG. 3 is a system diagram (when fuel for the gas turbine suddenly decreases significantly) illustrating the water feeding system of the first embodiment according to the present invention.

As illustrated in FIG. 2, a water feeding system 50 of the present embodiment includes the above-described high-pressure water line 143, high-pressure heated water line 144, intermediate-pressure heated water diverging line 145, high-pressure water introducing line 149, cooling water injecting line 151, valves and measuring instruments provided in those lines, air cooler 32, second fuel preheater 24, and high-pressure fuel economizer 112c.

Here, for convenience, in the following description, a line formed by the high-pressure water line 143 and the high-pressure heated water line 144 will be referred to as a first feed water line 51. The first feed water line 51 includes a first feed water main line 51a and a first feed water diverging line 51b. The first feed water main line 51a is formed by the high-pressure heated water line 144 and the high-pressure water main line 147 that forms a part of the high-pressure water line 143. The first feed water diverging line 51b is formed by the high-pressure water diverging line 148.

Further, the intermediate-pressure heated water diverging line 145 will be referred to as a second feed water line 52. The high-pressure water introducing line 149 will be referred to as a first feed water introducing line 53. Further, the air cooler 32 and the high-pressure fuel economizer 112c will be respectively referred to as a first heater 32 and a second heater 112c. Furthermore, the first fuel preheater 23 and the second fuel preheater 24 will be respectively referred to as a second medium heat exchanger 23 and a first medium heat exchanger 24.

As described above with reference to FIG. 1, a portion of the low-pressure heated water that is the low-pressure water heated by the low-pressure fuel economizer 112a is pressurized by the intermediate-pressure pump 116b and supplied to the intermediate-pressure fuel economizer 112b as intermediate-pressure water. This intermediate-pressure water is heated by the intermediate-pressure fuel economizer 112b and turns into intermediate-pressure heated water. As illustrated in FIG. 2, this intermediate-pressure heated water is supplied to the second medium heat exchanger 23, which is the first fuel preheater 23, as second feed water, via the intermediate-pressure heated water line 142 and the second feed water line 52, which is the intermediate-pressure heated water diverging line 145. In the second medium heat exchanger 23, the fuel F, which acts as a medium, is caused to exchange heat with the second feed water (the intermediate-pressure heated water), thereby heating the medium and cooling the second feed water.

As described above with reference to FIG. 1, another portion of the low-pressure heated water that is the low-pressure water heated by the low-pressure fuel economizer 112a is pressurized by the high-pressure pump 116c and turns into high-pressure water. As illustrated in FIG. 2, this high-pressure water flows, as first feed water, through the first feed water line 51 that is formed by the high-pressure water line 143 and the high-pressure heated water line 144. This first feed water has a higher pressure than the second feed water flowing through the second feed water line 52. In other words, the second feed water flowing through the second feed water line 52 has a lower pressure than the first feed water flowing through the first feed water line 51. Meanwhile, the first feed water that is flowing through the first feed water line 51 but has not yet reached the first heater 32 and the second heater 112c has a lower temperature than the second feed water flowing through the second feed water line 52. A portion of the first feed water is supplied to the second heater 112c, which is the high-pressure fuel economizer 112c, via the first feed water main line 51a. The first feed water is heated in the second heater 112c. The first feed water heated in the second heater 112c is supplied to the high-pressure evaporator 113 via the first feed water main line 51a. Another portion of the first feed water is supplied to the first heater 32, which is the air cooler 32, via the first feed water diverging line 51b.

Figure 4:
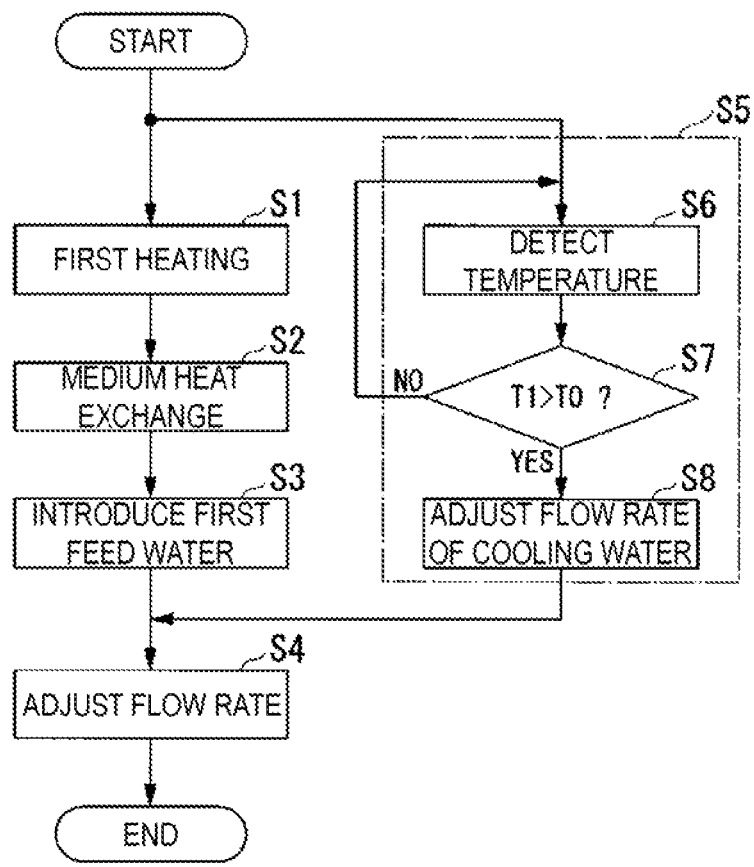
FIG. 4 is a flowchart illustrating operations of the water feeding system according to the first embodiment of the present invention.

Processing in the water feeding system 50 of the present embodiment will be described in accordance with a flow-chart illustrated in FIG. 4.

The first feed water is heated in the first heater 32 (S1: a first heating step). A portion of the first feed water heated in the first heater 32 flows into the first feed water main line 51a via the first feed water diverging line 51b. The first feed water heated in the first heater 32 is supplied to the high-pressure evaporator 113c together with the first feed water heated in the second heater 112c.

Another portion of the first feed water heated in the first heater 32 is supplied to the first medium heat exchanger 24, which is the second fuel preheater 24, via the first feed water introducing line 53, which is the high-pressure water introducing line 149. In the first medium heat exchanger 24, the fuel F, which acts as the medium, is caused to exchange heat with the first feed water, thereby heating the medium and cooling the first feed water (S2: a medium heat exchange step). The fuel F that is caused to exchange heat with the first feed water, as the medium, in the first medium heat exchanger 24 is the fuel F heated in the second medium heat exchanger 23. The first feed water cooled in the medium heat exchange step (S2) is introduced into the second feed water line 52 via the first feed water introducing line 53 (S3: a first feed water introducing step). This first feed water is supplied to the second medium heat exchanger 23 together with the second feed water.

The flow rate of the first feed water flowing through the first feed water introducing line 53 is detected by the flow rate meter 156. The collected water flow rate adjustment valve 155 adjusts its valve opening amount so as to cause the flow rate detected by the flow rate meter 156 to become a target flow rate (S4: a flow rate adjusting step). This target flow rate is set in accordance with the output of the gas turbine 10 and/or the flow rate of the fuel supplied to the gas turbine 10. For example, in a case that the output of the gas turbine 10 or the flow rate of the fuel supplied to the gas turbine 10 increases, the target flow rate also increases.

The temperature of the first feed water that has just flowed out from the first medium heat exchanger 24 is higher than that of the first feed water that has not yet been heated by the first heater 32, and close to the temperature of the second feed water flowing through the second feed water line 52. The pressure of the first feed water is reduced in the course of passing through the collected water flow rate adjustment valve 155 provided in the first feed water introducing line 53, and becomes almost identical to the internal pressure of the second feed water line 52.

In the water feeding system 50 of the present embodiment, a cooling water injecting step (S5) is also carried out in parallel with the above-described steps. In the cooling water injecting step (S5), the thermometer 154 detects the temperature of the water flowing through a section, of the first feed water introducing line 53, located between the connection position of the first feed water introducing line 53 with the cooling water injecting line 151 and the first medium heat exchanger 24 (S6: a temperature detecting step). In the cooling water injecting step (S5), when a temperature T1 detected in the temperature detecting step (S6) is not higher than a predetermined set temperature T0, the processing returns to the temperature detecting step (S6) (NO at S7). On the other hand, when the temperature T1 detected in the temperature detecting step (S6) is higher than the set temperature T0, the processing advances to a cooling water flow rate adjusting step (S8). As illustrated in FIG. 3, in the cooling water flow rate adjusting step (S8) of the cooling water injecting step (S5), an opening amount of the cooling water flow rate adjustment valve 152 is controlled and the flow rate of the cooling water injected into the first feed water introducing line 53 from the cooling water injecting line 151 is adjusted, such that the temperature T1 detected by the thermometer 154 becomes the set temperature T0. This cooling water is first non-heated feed water, which is the first feed water that has not yet been heated by the first heater 32. More specifically, when the temperature T1 detected by the thermometer 154 is higher than the set temperature T0, for example, the cooling water flow rate adjustment valve 152 is caused to open. At this time, the opening amount of the cooling water flow rate adjustment valve 152 is an opening amount corresponding to a deviation between the temperature T1 detected by the thermometer 154 and the set temperature T0, for example. When the temperature T1 detected by the thermometer 154 is higher than the set temperature T0, the cooling water flow rate adjustment valve 152 is caused to open, and the cooling water is injected into the first feed water introducing line 53. As a result, the temperature in a section, of the first feed water introducing line 53, located further to the second feed water line 52 side than the cooling water injecting line 151, falls, and the temperature detected by the thermometer 154 becomes the set temperature T0.

This cooling water and the first feed water are mixed together and introduced into the second feed water line 52 via the collected water flow rate adjustment valve 155. After the flow rate of water, which is obtained as a result of the cooling water and the first feed water being mixed together, is adjusted by the collected water flow rate adjustment valve 155 (S4: the flow rate adjusting step), the mixed water is introduced into the second feed water line 52.

Hypothetically, a case is considered here in which the set temperature T0 is slightly higher than the temperature of the first feed water flowing out of the first medium heat exchanger 24 during a steady operation of the gas turbine 10.

In this case, during the steady operation of the gas turbine 10, the cooling water flow rate adjustment valve 152 provided in the cooling water injecting line 151 is closed, as illustrated in FIG. 2. Thus, during the steady operation of the gas turbine 10, the first feed water, which is the high-pressure water that has not yet been heated by the first heater 32, is not injected into the first feed water introducing line 53, as the cooling water, via the cooling water injecting line 151.

In a case that there is an emergency shut down of the gas turbine 10, or in a case that the output of the gas turbine 10 is suddenly reduced significantly, a valve opening amount of the fuel flow rate adjustment valve 22 provided in the fuel supply line 21 suddenly changes to a completely closed or slightly open state. In this case, the flow rate of the fuel F flowing through the fuel supply line 21 suddenly decreases significantly. When the flow rate of the fuel F suddenly decreases significantly, an amount of heat exchanged between the fuel F, which acts as the medium, and the water in the first medium heat exchanger 24 suddenly decreases significantly. As a result, an amount of cooling performed on the water flowing into the first medium heat exchanger 24 suddenly decreases significantly, and the temperature of the first feed water that has just flowed out from the first medium heat exchanger 24 becomes higher than the temperature thereof during the steady operation of the gas turbine 10.

When the temperature of the first feed water introduced into the second feed water line 52 becomes higher than the temperature thereof during the steady operation of the gas turbine 10, there is a risk of flashing of the first feed water in the course of flowing into the second feed water line 52. In a case that the water flashes inside the line, there is a risk that piping forming the line or various instruments provided in the line may be damaged.

Thus, in the present embodiment, when the temperature T1 detected by the thermometer 154 becomes higher than the set temperature T0, the cooling water flow rate adjusting step (S8) of the cooling water injecting step (S5) is performed as described above. When the cooling water flow rate adjusting step (S8) is performed, as illustrated in FIG. 3, the cooling water flow rate adjustment valve 152 is caused to open, and the cooling water is injected into the first feed water introducing line 53 from the cooling water injecting line 151. Then, the temperature of the water in the section, of the first feed water introducing line 53, located further to the second feed water line 52 side than the cooling water injecting line 151, falls, and the temperature T1 detected by the thermometer 154 becomes the set temperature T0.

Thus, in the present embodiment, even when the amount of heat exchanged between the fuel F, which flows into the first medium heat exchanger 24 as the medium, and the water suddenly decreases significantly, the water can be prevented from flashing in the course of the water being introduced into the second feed water line 52 from the first feed water introducing line 53. Further, in the present embodiment, when the temperature of the first feed water that has just flowed out from the first medium heat exchanger 24 becomes higher than the temperature thereof during the steady operation of the gas turbine 10, the cooling water is injected into the first feed water instead of the first feed water being discharged into the condenser as in the technology disclosed in Patent Document 1 described in the Background Art above. Thus, compared with the technology disclosed in Patent Document 1, in the present embodiment, a sudden and significant decrease in the flow rate of the water flowing into the second feed water line 52 can be inhibited, and as a result, the water feeding system 50 and the exhaust heat recovery facility 100 can be operated in a stable manner.

Note that the description made above is based on the case in which the set temperature T0 is slightly higher than the temperature of the first feed water flowing out of the first medium heat exchanger 24 during the steady operation of the gas turbine 10. However, the set temperature T0 may be slightly lower than the temperature of the first feed water flowing out of the first medium heat exchanger 24 during the steady operation of the gas turbine 10, for example. In this case, during the steady operation of the gas turbine 10, the temperature of the first feed water that has just flowed out from the first medium heat exchanger 24 is slightly higher than the set temperature T0. Thus, in this case, even during the steady operation of the gas turbine 10, the cooling water flow rate adjustment valve 152 is slightly open, and the cooling water is injected into the first feed water introducing line 53 from the cooling water injecting line 151, thereby causing the temperature T1 detected by the thermometer 154 to become the set temperature T0. Further, as described above, in the case that there is an emergency shut down of the gas turbine 10, or in the case that the output of the gas turbine 10 is suddenly reduced significantly, for example, when the temperature of the first feed water that has just flowed out from the first medium heat exchanger 24 becomes higher than the temperature thereof during the steady operation of the gas turbine 10, the opening amount of the cooling water flow rate adjustment valve 152 is caused to become larger than the opening amount thereof during the steady operation. As a result, in this case, a larger amount of the cooling water is injected into the first feed water introducing line 53 from the cooling water injecting line 151 than the amount thereof during the steady operation, thereby causing the temperature T1 detected by the thermometer 154 to become the set temperature T0.

Second Embodiment

A second embodiment of the combined cycle plant provided with the water feeding system according to the present invention will be described below with reference to FIG. 5 and FIG. 6.

Figure 5:
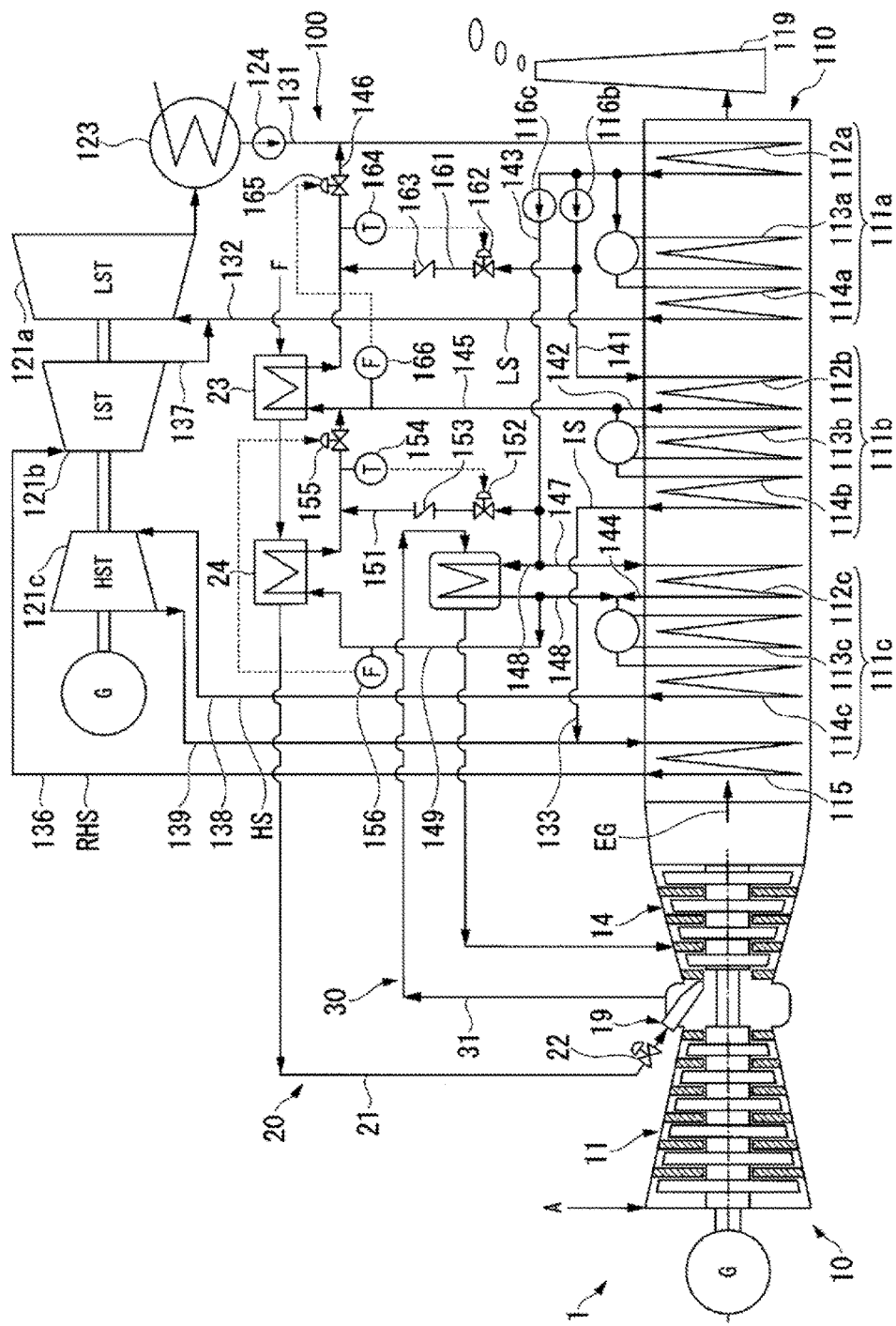
FIG. 5 is a system diagram illustrating a combined cycle plant of a second embodiment according to the present invention.
Figure 6:
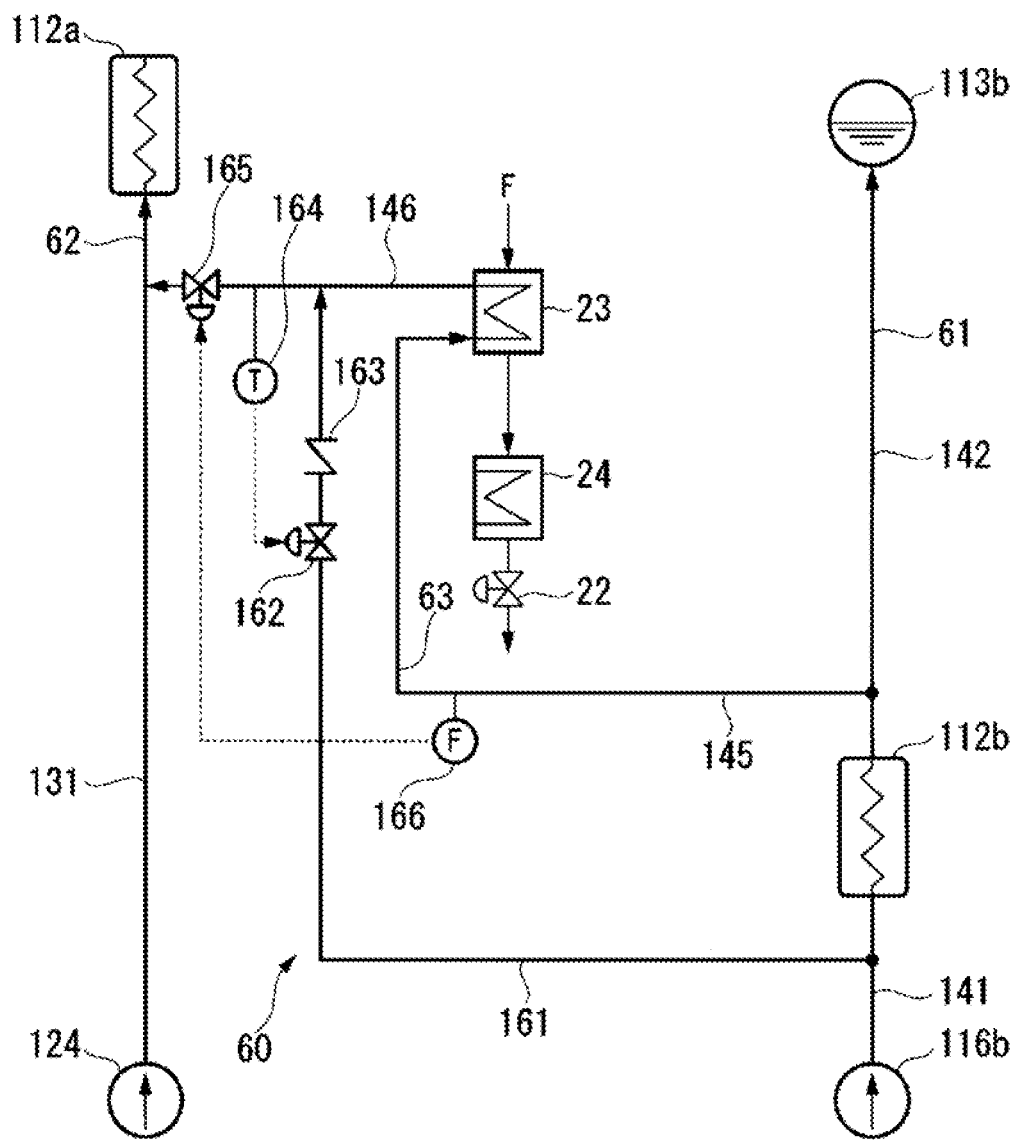
FIG. 6 is a system diagram illustrating a second water feeding system of the second embodiment according to the present invention.

As illustrated in FIG. 5, the combined cycle plant of the present embodiment is formed by adding a cooling water injecting line 161, a cooling water flow rate adjustment valve 162, a check valve 163, and a thermometer 164 to the combined cycle plant of the first embodiment, and the rest of the configuration is basically the same as that of the first embodiment.

One end of the cooling water injecting line 161 is connected to the intermediate-pressure water line 141, and the other end of the cooling water injecting line 161 is connected to the intermediate-pressure water collection line 146 at a position located between the first fuel preheater 23 and the collected water flow rate adjustment valve 165. The cooling water flow rate adjustment valve 162 and the check valve 163 are both provided in this cooling water injecting line 161. The thermometer 164 is provided at a position, in the intermediate-pressure water collection line 146, located between a connection position thereof with the cooling water injecting line 161 and the collected water flow rate adjustment valve 165.

As described above, the combined cycle plant of the present embodiment is formed by adding the cooling water injecting line 161 and the like to the combined cycle plant of the first embodiment. Thus, the combined cycle plant of the present embodiment also includes the water feeding system 50 (hereinafter referred to as a first water feeding system 50) in which the air cooler 32 is provided as the first heater 32 in the same manner as in the combined cycle plant of the first embodiment. Further, the combined cycle plant of the present embodiment includes a water feeding system (hereinafter referred to as a second water feeding system 60) in which the intermediate-pressure fuel economizer 112b is provided as a first heater 112b.

Next, the second water feeding system 60 of the present embodiment will be described with reference to FIG. 6.

The second water feeding system 60 of the present embodiment includes the intermediate-pressure water line 141, the intermediate-pressure heated water line 142, the intermediate-pressure heated water diverging line 145, the intermediate-pressure water collection line 146, the cooling water injecting line 161, valves and measuring instruments provided in those lines, the intermediate-pressure fuel economizer 112b, and the first fuel preheater 23.

Here, for convenience of the following description, a line formed by the intermediate-pressure water line 141 and the intermediate-pressure heated water line 142 will be referred to as a first feed water line 61. The feed water line 131 that connects the condenser 123 and the low-pressure fuel economizer 112a of the exhaust heat recovery boiler 110 (see FIG. 5) will be referred to as a second feed water line 62. A line that is formed by the intermediate-pressure heated water diverging line 145 and the intermediate-pressure water collection line 146 will be referred to as a first feed water introducing line 63. Further, the intermediate-pressure fuel economizer 112b and the first fuel preheater 23 will be referred to as the first heater 112b and a medium heat exchanger 23, respectively.

As described above with reference to FIG. 1 in the first embodiment, the water from the condenser 123 is pressurized by the feed water pump 124 and supplied, as the second feed water, to the low-pressure fuel economizer 112a of the exhaust heat recovery boiler 110 via the second feed water line 62, which is the feed water line 131. A portion of the low-pressure heated water that is the low-pressure water heated by the low-pressure fuel economizer 112a is pressurized by the intermediate-pressure pump 116b and supplied, as intermediate-pressure water, to the intermediate-pressure fuel economizer 112b via the intermediate-pressure water line 141. This intermediate-pressure water is heated by the intermediate-pressure fuel economizer 112b and turns into intermediate-pressure heated water. More specifically, as illustrated in FIG. 6, the first feed water, which is the intermediate-pressure water, is supplied to the intermediate-pressure fuel economizer 112b, which is the first heater 112b, via the first feed water line 61, which is the intermediate-pressure water line 141. This first feed water has a higher pressure than the second feed water. This first feed water is heated by the first heater 112b (S1: the first heating step (see FIG. 4)).

A portion of the first feed water heated in the first heater 112b is supplied to the medium heat exchanger 23, which is the first fuel preheater 23, via the first feed water introducing line 63 that is formed by the intermediate-pressure heated water diverging line 145 and the intermediate-pressure water collection line 146. In the medium heat exchanger 23, the fuel F, which acts as the medium, is caused to exchange heat with the first feed water, thereby heating the medium and cooling the first feed water (S2: the medium heat exchange step). This first feed water is introduced into the second feed water line 62 via the first feed water introducing line 63 (S3: the first feed water introducing step). This first feed water is supplied to the low-pressure fuel economizer 112a of the exhaust heat recovery boiler via the second feed water line 62 together with the second feed water, which is the water supplied from the feed water pump 124.

The flow rate of the first feed water flowing through the first feed water introducing line 63 is detected by the flow rate meter 166. The collected water flow rate adjustment valve 165 adjusts its valve opening amount so as to cause the flow rate detected by the flow rate meter 166 to become a target flow rate (S4: the flow rate adjusting step). This target flow rate is set in accordance with the output of the gas turbine 10 and/or the flow rate of the fuel supplied to the gas turbine 10.

The temperature of the first feed water that has just flowed out from the medium heat exchanger 23 is lower than that of the first feed water that has just been heated in the first heater 112b, and is close to the temperature of the second feed water. The pressure of the first feed water is reduced in the course of passing through the collected water flow rate adjustment valve 165 provided in the first feed water introducing line 63, and becomes almost identical to the internal pressure of the second feed water line 62.

In the second water feeding system 60 of the present embodiment, the cooling water injecting step (S5) is also carried out in parallel with the above-described steps, as in the first water feeding system 50. In the cooling water injecting step (S5), the thermometer 164 detects the temperature of the water flowing through a section, of the first feed water introducing line 63, located between a connection position of the first feed water introducing line 63 with the cooling water injecting line 161 and the medium heat exchanger 23 (S6: the temperature detecting step). In the cooling water injecting step (S5), when a temperature T a detected in the temperature detecting step (S6) is not higher than a predetermined set temperature T0a, the processing returns to the temperature detecting step (S6) (NO at S7). On the other hand, when the temperature T1a detected in the temperature detecting step (S6) is higher than the set temperature T0a, the processing advances to the cooling water flow rate adjusting step (S8). In the cooling water flow rate adjusting step (S8) of the cooling water injecting step (S5), in the same manner as in the first embodiment, an opening amount of the cooling water flow rate adjustment valve 162 is controlled and the flow rate of the cooling water flowing into the first feed water introducing line 63 from the cooling water injecting line 161 is adjusted, such that the temperature detected by the thermometer 164 becomes the set temperature T0a. This cooling water is first non-heated feed water, which is the first feed water that has not yet been heated by the first heater 112b. As a result, the temperature of the water in a section, of the first feed water introducing line 63, located further to the second feed water line 62 side than the connection position of the first feed water introducing line 63 with the cooling water injecting line 161, falls, and the temperature detected by the thermometer 164 becomes the set temperature T0a.

Hypothetically, here, a case is considered in which the set temperature T0a is slightly higher than the temperature of the first feed water flowing out from the medium heat exchanger 23 during the steady operation of the gas turbine 10.

In this case, during the steady operation of the gas turbine 10, the cooling water flow rate adjustment valve 162 provided in the cooling water injecting line 161 is closed. Thus, during the steady operation of the gas turbine 10, the first feed water, which is the intermediate-pressure water that has not yet been heated by the first heater 112b, is not injected into the first feed water introducing line 63 via the cooling water injecting line 161.

As described above, in the case that there is an emergency shut down of the gas turbine 10, or in the case that the output of the gas turbine 10 is suddenly reduced significantly, the flow rate of the fuel flowing through the fuel supply line 21 suddenly decreases significantly.

When the flow rate of the fuel suddenly decreases significantly, the amount of heat exchanged between the fuel F, which acts as the medium, and the water in the medium heat exchanger 23 suddenly decreases significantly. As a result, the amount of cooling performed on the water flowing into the medium heat exchanger 23 suddenly decreases significantly, and the temperature of the first feed water that has just flowed out from the medium heat exchanger 23 becomes higher than the temperature thereof during the steady operation of the gas turbine 10.

When the temperature of the first feed water introduced into the second feed water line 62 becomes higher than the temperature thereof during the steady operation of the gas turbine 10, there is a risk of flashing of the first feed water in the course of flowing into the second feed water line 62.

Thus, in the present embodiment, when the temperature T1a detected by the thermometer 164 becomes higher than the predetermined temperature T0a, the cooling water flow rate adjusting step (S8) of the cooling water injecting step (S5) is performed as described above.

Thus, also in the second water feeding system 60 of the present embodiment, in the same manner as in the first water feeding system 50, the flashing can be prevented from occurring inside the line, and the sudden and significant decrease in the flow rate of the water flowing into the second feed water line 62 can be inhibited.

As described above, the combined cycle plant of the present embodiment includes the first water feeding system 50 and the second water feeding system 60. However, when there is no risk of the flashing occurring inside the first feed water introducing line 53 of the first water feeding system 50 for a reason relating to the water temperature, pressures and the like, the cooling water injecting line 151 need not necessarily be provided in the first water feeding system 50. Further, when there is no risk of the flashing occurring inside the first feed water introducing line 63 of the second water feeding system 60 for a reason relating to the water temperature, pressures and the like, similarly to the first embodiment, the cooling water injecting line 161 need not necessarily be provided in the second water feeding system 60.

Note that, also in the present embodiment, as described above in the first embodiment, the set temperature T0a may be slightly lower than the temperature of the first feed water flowing out from the medium heat exchanger 23 during the steady operation of the gas turbine 10, for example.

Modified Example

In each of the water feeding systems 50 and 60 of the above-described embodiments, the flow rate of the water is detected by the flow rate meters 156 and 166, and feedback control is performed so as to cause the flow rate detected by the flow rate meters 156 and 166 to become the target flow rate. However, the flow rate of the water need not necessarily be detected by the flow rate meters 156 and 166. In this case, the target flow rate of the water is set in accordance with the operation conditions of the gas turbine 10, such as a load of the gas turbine 10, for example, and feedforward control is performed so as to cause an actual flow rate of the water to become the target flow rate of the water.

In the water feeding system 50 of the above-described embodiments, the cooling water injecting line 151 is connected to the first feed water main line 51a at the position located further to the high-pressure pump 116c side than the branching position of the first feed water diverging line 51b. However, this cooling water injecting line 151 may be connected to the first feed water diverging line 51b at a position located further to the first feed water main line 51a side than the first heater 32. Further, this cooling water injecting line 151 may be connected to the first feed water main line 51a at a position located between the branching position of the first feed water diverging line 51b and the second heater 112c. More specifically, the cooling water injecting line 151 may be connected to any position, as long as the position enables the first feed water that is flowing through the first feed water line 51 and that has not yet reached the first heater 32 and the second heater 112c to flow into the cooling water injecting line 151.

In the water feeding system 50 of the above-described embodiments, the first feed water introducing line 53 is connected to the intermediate-pressure heated water diverging line 145, and this intermediate-pressure heated water diverging line 145 is the second feed water line 52. However, the first feed water introducing line 53 may be connected to the intermediate-pressure heated water line 142 at a position located further to the intermediate-pressure fuel economizer 112b side than a branching position of the intermediate-pressure heated water diverging line 145, and a section of the intermediate-pressure heated water line 142, which is located further to the intermediate-pressure fuel economizer 112b side than the branching position of the intermediate-pressure heated water diverging line 145 may be the second feed water line. More specifically, the second feed water line is not limited to the second feed water line 52 of the above-described embodiments, as long as the second feed water line is a line through which water having a lower pressure than the first feed water flowing through the first feed water line 51 flows.

Further, in each of the water feeding systems of the above-described embodiments, the first feed water that has not yet been heated by the first heater is used as the cooling water for cooling the first feed water that has just flowed out from the medium heat exchanger. However, the cooling water need not necessarily be the first feed water that has not yet been heated by the first heater, and may be any other kind of water as long as the water can cool the first feed water that has just flowed out from the medium heat exchanger. However, when other kind of water is used, a device for pressurizing the other kind of water is separately required such that the water can be injected into the first feed water that has just flowed out from the medium heat exchanger. Meanwhile, as in each of the above-described embodiments, when the first feed water that has not yet been heated by the first heater is used as the cooling water, the device for pressurizing the cooling water is not required separately.

All of the medium heat exchangers of the above-described embodiments cause the water to exchange heat with the fuel F that acts as the medium. However, the medium in the medium heat exchanger need not necessarily be the fuel F, but may be any other kind of medium.

Each of the embodiments described above is an example in which the present invention is applied to the combined cycle plant that is a plant that combines a gas turbine and a steam turbine. However, the present invention may be applied to any plant other than the combined cycle plant. For example, the present invention may be applied to a plant that is provided with a gas turbine and an exhaust heat recovery boiler but is not provided with a steam turbine. Further, the present invention may be applied to a plant that is provided with a boiler but not provided with either a gas turbine or a steam turbine. More specifically, the present invention may be applied to any plant as long as the plant has an environment in which water that has passed through a medium heat exchanger that causes the water to exchange heat with a medium may flash.

INDUSTRIAL APPLICABILITY

According to an aspect of the present invention, even when an amount of heat exchanged between water and a medium suddenly decreases significantly, a change in operation conditions of a system can be inhibited while the water is prevented from flashing.

REFERENCE SIGNS LIST

1 Gas turbine installation
10 Gas turbine
11 Compressor
12 Compressor rotor
14 Turbine
15 Turbine rotor
15a Rotor shaft
15b Blade row
16 Turbine casing
19 Combustor
20 Fuel supply system
21 Fuel supply line
22 Fuel flow rate adjustment valve
23 First fuel preheater (Medium heat exchanger or second medium heat exchanger)
24 Second fuel preheater (Medium heat exchanger or first medium heat exchanger)
30 Component cooling system
31 Air extraction line
32 Air cooler (First heater)
50 Water feeding system (First water feeding system)
51, 61 First feed water line
51a First feed water main line
51b First feed water diverging line
52, 62 Second feed water line
53, 63 First feed water introducing line
60 Second water feeding system
100 Exhaust heat recovery device
110 Exhaust heat recovery boiler
111a Low-pressure steam generating part
111b Intermediate-pressure steam generating part
111c High-pressure steam generating part
112a Low-pressure fuel economizer
113a Low-pressure evaporator
114a Low-pressure superheater
112b Intermediate-pressure fuel economizer (First heater)
113b Intermediate-pressure evaporator
114b Intermediate-pressure superheater
112c High-pressure fuel economizer (Second heater)
113c High-pressure evaporator
114c High-pressure superheater
116b Intermediate-pressure pump
116c High-pressure pump
119 Stack
121a Low-pressure steam turbine
121b Intermediate-pressure steam turbine
121c High-pressure steam turbine
123 Condenser
124 Feed water pump
131 Feed water line
132 Low-pressure steam line
133 Intermediate-pressure steam line
136 Reheat steam line
137 Intermediate-pressure steam collection line
138 High-pressure steam line
139 High-pressure steam collection line
141 Intermediate-pressure water line 142 Intermediate-pressure heated water line
143 High-pressure water line
144 High-pressure heated water line
145 Intermediate-pressure heated water diverging line
146 Intermediate-pressure water collection line
147 High-pressure water main line
148 High-pressure water diverging line
149 High-pressure water introducing line
151, 161 Cooling water injecting line
152, 162 Cooling water flow rate adjustment valve
153, 163 Check valve
154, 164 Thermometer
155, 156 Collected water flow rate adjustment valve
156, 166 Flow rate meter

The invention claimed is:

1. A water feeding system, comprising:
    a first feed water line through which first feed water flows;
    a second feed water line through which second feed water having a lower pressure than the first feed water flows;
    a first heater configured to heat the first feed water;
    a first feed water introducing line configured to guide first heated feed water which is the first feed water heated by the first heater to the second feed water line;
    a medium heat exchanger provided in the first feed water introducing line and configured to cause the first heated feed water to exchange heat with a medium, thereby cooling the first heated feed water and heating the medium; and
    a cooling water injecting line configured to inject cooling water into the first feed water introducing line at a position located further to the second feed water line side than the medium heat exchanger, the cooling water having a lower temperature than the first heated feed water.

2. The water feeding system according to claim 1, wherein
    the cooling water injecting line is a line branching out from a section in the first feed water line through which first non-heated feed water flows, the first non-heated feed water being the first feed water not yet heated by the first heater, and
    the cooling water injecting line injects the first non-heated feed water, as the cooling water, into the first feed water introducing line.

3. The water feeding system according to claim 1, further comprising:
    a thermometer configured to detect a temperature of water at a position, in the first feed water introducing line, located further to the second feed water line side than a position at which the cooling water is injected from the cooling water injecting line; and
    a cooling water flow rate adjustment valve configured to adjust a flow rate of the cooling water flowing through the cooling water injecting line such that the temperature detected by the thermometer falls within a predetermined temperature range.

4. The water feeding system according to claim 1, further comprising:
    a flow rate adjustment valve provided at a position, in the first feed water introducing line, located further to the second feed water line side than the position at which the cooling water is injected from the cooling water injecting line, and configured to adjust a flow rate of water flowing into the second feed water line from the first feed water introducing line.

5. The water feeding system according to claim 1, wherein the first heater is a heat exchanger configured to cause compressed air extracted from a compressor of a gas turbine to exchange heat with the first feed water, thereby cooling the compressed air and heating the first feed water.

6. The water feeding system according to claim 1, wherein the first feed water line has a first feed water main line and a first feed water diverging line that branches out from the first feed water main line,
    the water feeding system further comprises a second heater that is provided at a position, in the first feed water main line, located further to a downstream side than a branching position of the first feed water diverging line, and is configured to heat the first feed water flowing through the first feed water main line, and
    the first heater is provided in the first feed water diverging line and is configured to heat the first feed water flowing through the first feed water diverging line.

7. The water feeding system according to claim 6, wherein the first feed water introducing line is connected to the first feed water diverging line,
    the first heater is provided at a position, in the first feed water diverging line, located further to the branching position side than a position at which the first feed water introducing line is connected to the first feed water diverging line, and
    the first feed water diverging line is connected to the first feed water main line at a position located further to the downstream side than the position at which the second heater is provided.

8. The water feeding system according to claim 1, further comprising:
    a second medium heat exchanger configured to cause the medium to exchange heat with water, thereby heating the medium and cooling the water, before the medium is heated by a first medium heat exchanger which is the medium heat exchanger.

9. The water feeding system according to claim 8, wherein the second medium heat exchanger is a heat exchanger that is provided at a position, in the second feed water line, located further to the downstream side than a position at which the first feed water introducing line is connected to the second feed water line, and is configured to cause water flowing through the second feed water line to exchange heat with the medium.

10. The water feeding system according to claim 1, wherein
    the medium is a fuel supplied to a gas turbine, and
    the medium heat exchanger is a fuel preheater configured to heat the fuel.

11. A steam generating facility, comprising:
    the water feeding system according to claim 1; and
    an evaporator configured to cause an exhaust gas from a gas turbine to exchange heat with the first feed water that has passed through the first feed water line and to cause the first feed water to be heated and turn into steam.

12. A steam generating facility, comprising:
    the water feeding system according to claim 1; and
    an evaporator configured to cause an exhaust gas from a gas turbine to exchange heat with the first feed water that has passed through the first feed water line and to cause the first feed water to be heated and turn into steam, wherein
    the first heater is a fuel economizer that causes the exhaust gas to exchange heat with the first feed water, thereby heating the first feed water flowing into the evaporator.

13. A steam generating facility, comprising:
    the water feeding system according to claim 6; and an evaporator configured to cause an exhaust gas from a gas turbine to exchange heat with the first feed water that has passed through the first feed water line and to cause the first feed water to be heated and turn into steam, wherein the second heater is a fuel economizer that causes the exhaust gas to exchange heat with the first feed water, thereby heating the first feed water flowing into the evaporator.

14. A water feeding method, comprising:

a first heating step of heating first feed water;

a medium heat exchange step of causing first heated feed water which is the first feed water heated in the first heating step to exchange heat with a medium, thereby cooling the first heated feed water and heating the medium;

a first feed water introducing step of introducing the first heated feed water which has gone through the medium heat exchange step into second feed water having a lower pressure than the first feed water; and a cooling water injecting step of injecting cooling water having a lower temperature than the first heated feed water into the first heated feed water before the first heated feed water that has gone through the medium heat exchange step is introduced into the second feed water.

15. The water feeding method according to claim 14, wherein first non-heated feed water that is the first feed water not yet heated in the first heating step is used as the cooling water in the cooling water injecting step.

16. The water feeding method according to claim 14, wherein the cooling water injecting step includes a cooling water flow rate adjusting step of adjusting a flow rate of the cooling water such that, before water including the first heated feed water is introduced into the second feed water, a temperature of the water falls within a predetermined temperature range.

17. The water feeding method according to claim 14, further comprising a flow rate adjusting step of adjusting a flow rate of water which includes the first heated feed water and is to be introduced into the second feed water.

18. The water feeding method according to claim 14, wherein in the first heating step, compressed air extracted from a compressor of a gas turbine is caused to exchange heat with the first feed water, thereby cooling the compressed air and heating the first feed water.

19. The water feeding method according to claim 14, wherein in the medium heat exchange step, a fuel supplied to a gas turbine is used as the medium to cause first heated feed water to exchange heat with the fuel, thereby cooling the first heated feed water and heating the fuel.

* * * * *